US011329896B1

(12) United States Patent
Narigapalli et al.

(10) Patent No.: US 11,329,896 B1
(45) Date of Patent: May 10, 2022

(54) COGNITIVE DATA PROTECTION AND DISASTER RECOVERY POLICY MANAGEMENT

(71) Applicant: KYNDRYL, INC., New York, NY (US)

(72) Inventors: Anil Kumar Narigapalli, Hyderabad (IN); Laxmikantha Sai Nanduru, R K Puram Post (IN); Venkateswarlu Basyam, Hyderabad (IN); Srilakshmi Surapaneni, Hyderabad (IN); Bernhard Julius Klingenberg, Grover Beach, CA (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/173,250

(22) Filed: Feb. 11, 2021

(51) Int. Cl.
*H04L 41/5019* (2022.01)
*H04L 47/2425* (2022.01)
(Continued)

(52) U.S. Cl.
CPC ........ *H04L 41/5019* (2013.01); *H04L 41/508* (2013.01); *H04L 41/5054* (2013.01); *H04L 41/5058* (2013.01); *H04L 47/2425* (2013.01)

(58) Field of Classification Search
CPC ............. H04L 41/5019; H04L 41/5058; H04L 41/5054; H04L 41/508; H04L 47/2425
See application file for complete search history.

(56) References Cited

U.S. PATENT DOCUMENTS

2008/0015889 A1  1/2008  Fenster
2008/0282321 A1* 11/2008 Hecht .................. G06F 21/604
                                                          726/1
(Continued)

FOREIGN PATENT DOCUMENTS

WO   2001026007 A1   4/2001

OTHER PUBLICATIONS

Assured DP, "Accelerate GDPR Compliance With Rubrik From Assured DP," https://assured-dp.com/wp-content/uploads/2018/05/GDPR-White-Paper.pdf. 3 pages.
(Continued)

*Primary Examiner* — Gil H. Lee
*Assistant Examiner* — Chhian (Amy) Ling
(74) *Attorney, Agent, or Firm* — Schmeiser, Olsen & Watts, LLP; Ken Han (57) ABSTRACT

An embodiment for cognitively aligning data protection (DP) and disaster recovery (DR) policies is provided. The embodiment may include ingesting a variety of data associated with one or more applications into a repository. The embodiment may also include executing differential analysis on the data and changes to the data to identify differences between the data and the changes to the data. The changes to the data may be obtained by periodically polling internal and external data sources. The embodiment may also include translating the differences between the data and the changes to the data into an updated SLA. The embodiment may further include in response to determining that the differences between the data and the changes to the data warrant a change in the current DP and DR policies, generating one or more recommendations to modify the current DP and DR policies and/or create new DP and DR policies.

20 Claims, 6 Drawing Sheets

(51) Int. Cl.
*H04L 41/50* (2022.01)
*H04L 41/5054* (2022.01)

(56) References Cited

U.S. PATENT DOCUMENTS

| | | | |
|---|---|---|---|
| 2009/0300409 A1 | 12/2009 | Bates | |
| 2011/0178993 A1* | 7/2011 | Blitzer | G06F 11/1458 707/E17.007 |
| 2012/0123999 A1* | 5/2012 | Ashutosh | G06F 16/128 707/618 |
| 2015/0229539 A1* | 8/2015 | Burke | H04L 41/5022 709/225 |
| 2017/0257389 A1* | 9/2017 | Cocchiara | H04L 41/5003 |
| 2017/0308421 A1 | 10/2017 | Angeles | |

OTHER PUBLICATIONS

Disclosed Anonymously, "System for the computation of a Dynamic Resiliency Score (DRS) using Supervised Machine Learning," IP.com, IP.com No. IPCOM000249430D, IP.com Publication Date: Feb. 27, 2017, 6 Pages.

EC-Council, "What Is a Business Continuity Plan and How Is It Used?", [accessed Dec. 21, 2020], Retrieved from the Internet: <https://www.eccouncil.org/business-continuity-and-disaster-recovery/>, 18 pages.

Iedunote, "Internal and External Environment Factors that Influences Organizational Decision Making," [accessed Nov. 2, 2020], Retrieved from the Internet: <https://www.iedunote.com/organizational-environment-elements>, 31 pages.

Jorrigala, "Business Continuity and Disaster Recovery Plan for Information Security," (2017). Culminating Projects in Information Assurance. 44, Retrieved from the Internet: <https://repository.stcloudstate.edu/msia_etds/44/? utm_source=repository.stcloudstate.edu%2Fmsia _etds%F44&utm_medium=PDF&utm_campaign=PDFCoverPages>, 90 pages.

Mahajan et al., "Service Level Agreement Driven Disaster Recovery," Symantec Corporation, IP.com No. IPCOM000227394D, IP.com Publication Date: May 6, 2013, Retrieved from the Internet: <https://priorart.ip.com/IPCOM/000227394>, 4 pages.

Mell et al., "The NIST Definition of Cloud Computing", National Institute of Standards and Technology, Special Publication 800-145, Sep. 2011, 7 pages.

Nguyen, "Understanding of Micro and Macro Factors That Affect Your Business," MAGEPLAZA, Dec. 1, 2020, Retrieved from the Internet: <https://www.mageplaza.com/blog/micro-and-macro-factors-affect-your-business.html>, 9 pages.

Sherman, "What Are Internal & External Environmental Factors That Affect Business?", Mar. 8, 2019, [accessed Nov. 2, 2020], Retrieved from the Internet: <https://smallbusiness.chron.com/internal-external-environmental-factors-affect-business-69474.html>, 5 pages.

TRP A Jensen Hughes Company, "Your Solution for Smart Response Plans," Blog, [accessed Dec. 21, 2020], Retrieved from the Internet: <https://www.emergency-response-planning.com/blog/topic/business-continuity-plan>, 39 pages.

Vmware, "Disaster Recovery," [accessed Nov. 2, 2020] Retrieved from the Internet: <https://www.vmware.com/topics/glossary/content/disaster-recovery>, 7 pages.

* cited by examiner

COGNITIVE DATA PROTECTION AND DISASTER RECOVERY POLICY MANAGEMENT

BACKGROUND

The present invention relates generally to the field of computing, and more particularly to a system for cognitively aligning data protection (DP) and disaster recovery (DR) policies of an organization with a current business climate and regulatory environment.

The external business climate and regulatory environment influences and impacts organizations profoundly. As such, organizations continually adapt to the changes occurring in the external business climate and regulatory environment. According to an information technology (IT) aspect, this means continuously reconfiguring the IT infrastructure in line with changes in this business climate and regulatory environment. A software application which was considered critical and important for an organization previously may or may not hold the same level of priority and importance in the present and in the future. As these applications gain or lose importance, their support ecosystem should follow the same trend. Additionally, technology associated threats (e.g., cyber threats and ransomware) may impose their own requirements in the form of government regulations and policies. Such requirements should also be incorporated into updates of the DP and DR policies of the organization.

SUMMARY

According to one embodiment, a method, computer system, and computer program product for cognitively aligning data protection (DP) and disaster recovery (DR) policies is provided. The embodiment may include ingesting a variety of data associated with one or more applications into a repository. The data may include a current priority of the one or more applications, current DP and DR policies contained in a service-level agreement (SLA), existing industry, sector, and government regulatory requirements, and new industry, sector, and government regulatory requirements. The embodiment may also include executing differential analysis on the data and changes to the data. The changes to the data may be obtained by periodically polling internal and external data sources. The embodiment may further include identifying differences between the data and the changes to the data based on the differential analysis. The embodiment may also include translating the differences between the data and the changes to the data into an updated SLA. The embodiment may further include in response to determining that the differences between the data and the changes to the data warrant a change in the current DP and DR policies, generating one or more recommendations to modify the current DP and DR policies and/or create new DP and DR policies.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for cognitively aligning data protection (DP) and disaster recovery (DR) policies of an organization with a current business climate and regulatory environment. The following described exemplary embodiments provide a system, method, and program product to, among other things, continually align the DP and DR policies of an organization with the current business climate and regulatory environment and, accordingly, maintain availability of applications and data per readjusted service-level agreements (SLAs). Therefore, the present embodiment has the capacity to improve the technical field of DP and DR policy management by ensuring the DP and DR policies of an organization are in line with dynamic changes in this business climate and regulatory environment.

As previously described, the external business climate and regulatory environment influences and impacts organizations profoundly. As such, organizations continually adapt to the changes occurring in the external business climate and regulatory environment. According to an information technology (IT) aspect, this means continuously reconfiguring the IT infrastructure in line with changes in this business climate and regulatory environment. A software application which was considered critical and important for an organization previously may or may not hold the same level of priority and importance in the present and in the future. As these applications gain or lose importance, their support ecosystem should follow the same trend. Additionally, technology associated threats (e.g., cyber threats and ransomware) may impose their own requirements in the form of government regulations and policies. Such requirements should also be incorporated into updates of the DP and DR policies of the organization. The global business environment is positively and negatively impacted by numerous factors that do not operate cyclically. Such factors include technology trends, industry and government regulations, as well as catastrophic events. Currently, there is no viable way of monitoring such trends and understanding their influence on the IT infrastructure of an organization. This problem is typically addressed by planning for DP and DR policy updates at various intervals, such as annually. However, this is generally a reactionary response that fails to consider the ever-changing external business environment and regulations so as to stay compliant and maintain an advantage over competitors. It may therefore be imperative to have a system in place to continually align the DP and DR policies of an organization in real-time with the ever-changing business climate and regulations. Thus, embodiments of the present invention may provide advantages including, but not limited to, continually reshaping the DP and DR policies of an organization to prevent damage to brand value and loss of market share, avoiding penalties due to breaches of SLAs, and technology driven maintenance of audit and regulatory compliance postures.

According to at least one embodiment, the system may ingest a variety of data associated with one or more applications into a repository. The data may include a current priority of the one or more applications, current DP and DR policies contained in a service-level agreement, existing industry, sector, and government regulatory requirements, new industry, sector, and government regulatory requirements, and the like. The system may then execute differential analysis on the data and changes to the data. The changes to the data may be obtained by periodically polling internal and external data sources. Upon executing the differential analysis, the system may identify differences between the data and the changes to the data based on the differential analysis. The system may then translate the differences between the data and the changes to the data into an updated SLA. In response to determining that the differences between the data and the changes to the data warrant a change in the current DP and DR policies, the system may generate one or more recommendations to modify the current DP and DR policies and/or create new DP and DR policies.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to continually align the DP and DR policies of an organization with the current business climate and regulatory environment and, accordingly, maintain availability of applications and data per readjusted SLAs.

Figure 1:
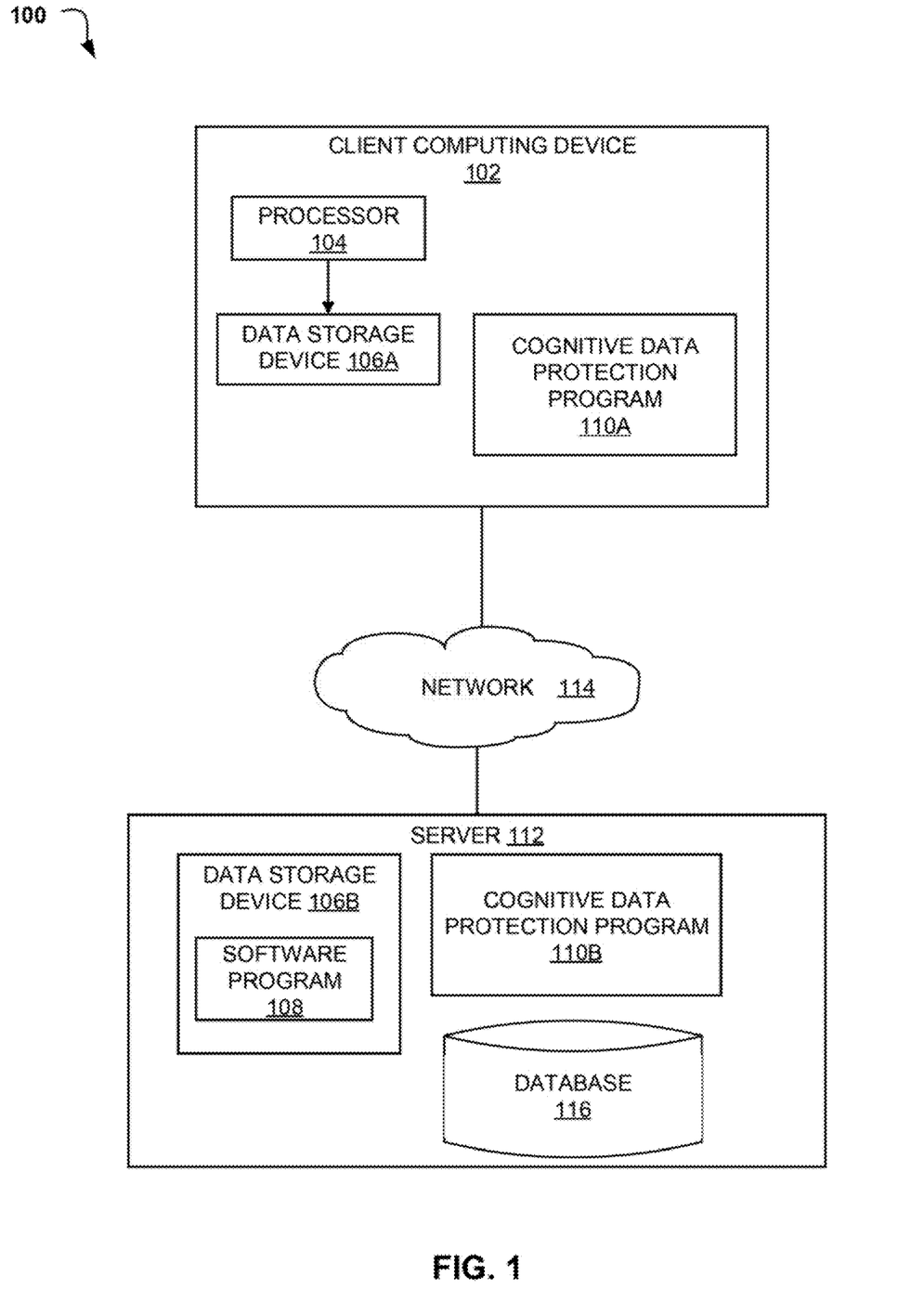
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106A that is enabled to host and run a cognitive data protection program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices and may include a data storage device 106B capable of hosting and running a software program 108, a cognitive data protection program 110B, and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the cognitive data protection program 110A, 110B may be a program capable of ingesting data into a repository, executing differential analysis to interpret changes to a current configuration of DP and DR policies, generating recommendations to modify the current DP and DR policies, continually reshaping the DP and DR policies of an organization to prevent damage to brand value and loss of market share, avoiding penalties due to breaches of SLAs, and technology driven maintenance of audit and regulatory compliance postures. The cognitive data protection method is explained in further detail below with respect to FIG. 2.

Figure 2:
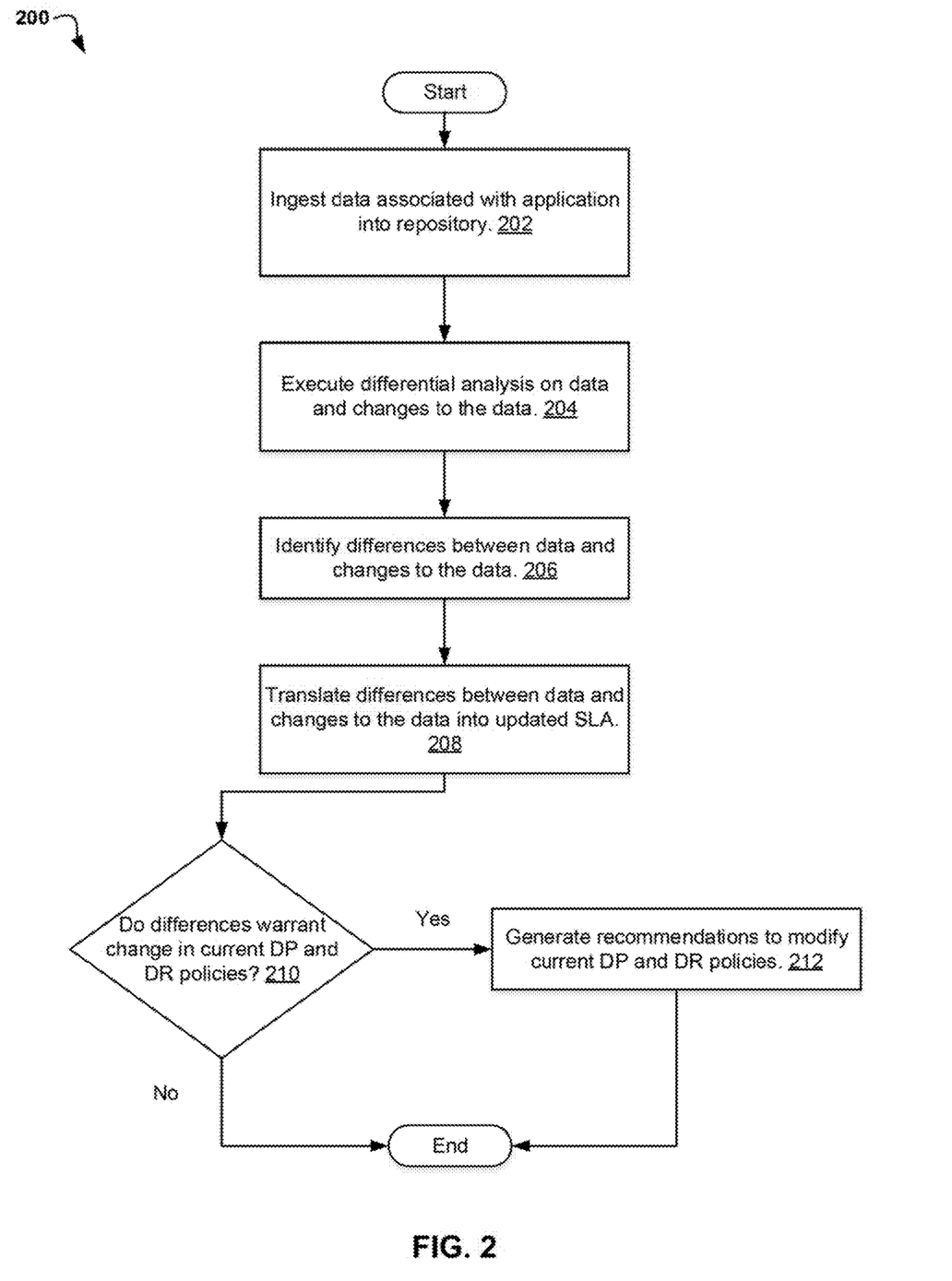
FIG. 2 illustrates an operational flowchart for managing cognitive data protection and disaster recovery policy in a cognitive data protection and disaster recovery policy management process according to at least one embodiment.

Referring now to FIG. 2, an operational flowchart for managing cognitive data protection and disaster recovery policy in a cognitive data protection and disaster recovery policy management process 200 is depicted according to at least one embodiment. At 202, the cognitive data protection program 110A, 110B ingests the variety of data associated with the one or more applications into the repository. The data includes a current priority of the one or more applications, current DP and DR policies that are contained in an SLA, existing industry, sector, and government regulatory requirements, and new industry, sector, and government regulatory requirements. The data may also include performance metrics data of products and services in an organization, business climate data, one or more geographic spans of the one or more applications, data retention requirements in the SLA, and internal details on policies and objectives of an organization. Using the software program 108 on the server 112, the data may be retrieved and ingested into the repository. The one or more applications may be mapped to one or more hosts and storage components, and priorities may be tagged to the one or more hosts based on the current priority of the one or more applications. This application-to-infrastructure mapping may also be stored in the repository. The cognitive data protection program 110A, 110B may periodically poll the internal sources as well as the external sources to find and incorporate changes to the data described above into the repository. Examples of data from internal sources include DP and DR SLAs, business performance data, and the current priority classification of an application. Examples of data from external sources include industry, sector, and government regulatory requirements, and business climate data. As described above, the external business climate may positively or negatively affect the performances of an organization's products and services. For example, a pandemic may devastate the travel industry, whereas web conference service providers may see a dramatic increase in market share.

Continuing the example, a travel organization may use "Application A" to serve the online transactions of its customers. At some point in time, "Application A" may have been assigned "mission critical" priority based on a high level of travel bookings. "Mission critical" priority may indicate that the highest tier DP and DR policies are implemented for "Application A." The current DP and DR policies associated with "Application A" with "mission critical" priority may include hourly snapshots for operational recovery, synchronous mirroring to a target site, and a daily backup sent to an alternate site and retained for one year. At a later point in time, the number of travel bookings may plummet. As a result, the organization may make the decision to reprioritize, i.e., change, "Application A" from "mission critical" to "medium." This example is continued in the description of the following steps.

Then, at 204, the cognitive data protection program 110A, 110B executes the differential analysis on the data and changes to the data. The changes to the data are obtained by periodically polling the internal sources and external sources as described above in step 202. The cognitive data protection program 110A, 110B may utilize pre-configured, customizable rules to execute the differential analysis.

Examples of such rules include determining whether the current application priority has changed as compared to a past priority existing in the DP and DR policies, determining whether the business performance has deteriorated as compared to previous differential analysis execution, determining whether the regulatory requirements have changed for applications serving online transactions, determining whether the DP requirements (e.g. backups, snapshots, replication and the like) have changed for legal data, determining whether the industry specific regulations (e.g. HIPAA, and the like) have changed for applications serving industry specific needs, and other rules known in the art for executing differential analysis.

These rules may contain the logic on how to identify the internal and external sources of data and how to differentiate new, i.e., changed, requirements and configurations from existing requirements and configurations, such as new industry, sector, and government regulatory requirements, as well as new geographic spans of the one or more applications, new data retention requirements, and new details on the policies and objectives of the organization. Any number of rules may be created dynamically to address any new requirements and configurations. These rules may also be fed to a cognitive analytics engine module where the differential analysis is executed. The cognitive analytics engine module may understand the current configuration of the DP and DR policies contained in the SLA that are associated with the one or more applications, as well as the current requirements and configurations of the other data described above in step 202. These current requirements and configurations may then be compared with the above new, i.e., changed, requirements and configurations. The cognitive analytics engine module may also detect the current priority of the one or more applications and whether that current priority is different from a past priority. Continuing the example above, the cognitive analytics engine module may detect that "Application A's" priority has been changed from "mission critical" to "medium."

Next, at 206, the cognitive data protection program 110A, 110B identifies the differences between the data and the changes to the data. The differences are identified based on the execution of the differential analysis described above in step 204. The cognitive analytics engine module may utilize a machine learning (ML) technique, such as natural language understanding (NLU), to parse the data and interpret the new requirements and configurations based on the module's understanding of the current requirements and configurations. Continuing the example above, the organization operating "Application A" may change its internal policies in response to the pandemic so that customers cannot book international flights. This policy change also reduces the geographic span of "Application A." Thus, the new requirements restricting customers from booking international flights and limiting "Application A's" geographic span may be identified by the cognitive data protection program 110A, 110B.

Then, at 208, the cognitive data protection program 110A, 110B translates the differences between the data and the changes to the data into the updated SLA. The updated SLA may be generated by including in the updated SLA data in a prior SLA which was not interpreted by the cognitive analytics engine module to have any changes associated with it, as well as the changed requirements and configurations. Continuing the example above, where the priority of "Application A" was changed from "mission critical" to "medium," the priority "medium" may be translated into the updated SLA. Also, the limited geographic span of "Application A" and the international flights restriction may be translated into the updated SLA.

Next, at 210, the cognitive data protection program 110A, 110B determines whether the differences between the data and the changes to the data warrant a change in the current DP and DR policies and/or the creation of new DP and DR policies. The determination may be made by comparing the updated SLA with the prior SLA. According to at least one embodiment, no changes to the data, and thus no updated SLA, may not warrant the change in the current DP and DR policies and/or the creation of the new DP and DR policies. According to at least one other embodiment, a detected difference in the priority of the one or more applications may warrant the change in the current DP and DR policies and/or the creation of the new DP and DR policies. Continuing the example above, if the priority of "Application A" was changed from "mission critical" to "medium," the current DP and DR policies associated with "Application A" may also be changed. According to at least one other embodiment, a detected difference in the priority of the one or more applications and at least one other difference between the data and the changes to the data may be required to warrant the change in the current DP and DR policies and/or the creation of the new DP and DR policies. Continuing the example above, if the priority of "Application A" was changed from "mission critical" to "medium," and the geographic span of "Application A" was changed from "international" to "North America," the current DP and DR policies associated with "Application A" may also be changed. In response to determining that the differences between the data and the changes to the data warrant a change, the cognitive data protection and disaster recovery policy management process 200 may proceed to step 212 to generate the one or more recommendations to modify the current DP and DR policies. In response to determining that the differences between the data and the changes to the data do not warrant a change, the cognitive data protection and disaster recovery policy management process 200 may end.

Then, at 212, the cognitive data protection program 110A, 110B generates the one or more recommendations to modify the current DP and DR policies and/or create the new DP and DR policies. A recommendation generator module may be utilized to generate the one or more recommendations. According to at least one embodiment, the one or more generated recommendations may be presented to a business stakeholder within the organization, such as a CEO or a manager. The business stakeholder may then manually modify the current DP and DR policies and/or create the new DP and DR policies in accordance with all of the generated recommendations, or alternatively in accordance with only some of the generated recommendations. According to at least one other embodiment, one or more orchestration engines may be utilized to automatically modify the current DP and DR policies and/or create the new DP and DR policies based on the one or more generated recommendations. In either embodiment, the modifications to the DP and DR policies and/or the creation of the new DP and DR policies may be translated into the updated SLA and stored in the repository. In the present embodiment, the one or more generated recommendations may be based on a detected difference between the current priority of the one or more applications and the past priority of the one or more applications. Continuing the example above, if the priority of "Application A" was changed from "mission critical" to "medium," the recommendation generator module may generate a recommendation to scale down the DP and DR requirements of "Application A" by implementing updated DP and DR policies that align with "medium" priority. Continuing the example above, where "mission critical" priority may require the current DP and DR policies to include hourly snapshots for operational recovery, synchronous mirroring to a target site, and a daily backup sent to an alternate site and retained for one year, "medium" priority may require updating the current DP and DR policies to include daily snapshots for operational recovery, asynchronous mirroring to a target site, and a daily backup sent to an alternate site and retained for three months. Conversely, if the priority of "Application A" was changed from "medium" to "mission critical," the recommendation generator module may generate a recommendation to scale up the DP and DR requirements of "Application A" by implementing updated DP and DR policies that align with "mission critical" priority.

Figure 3:
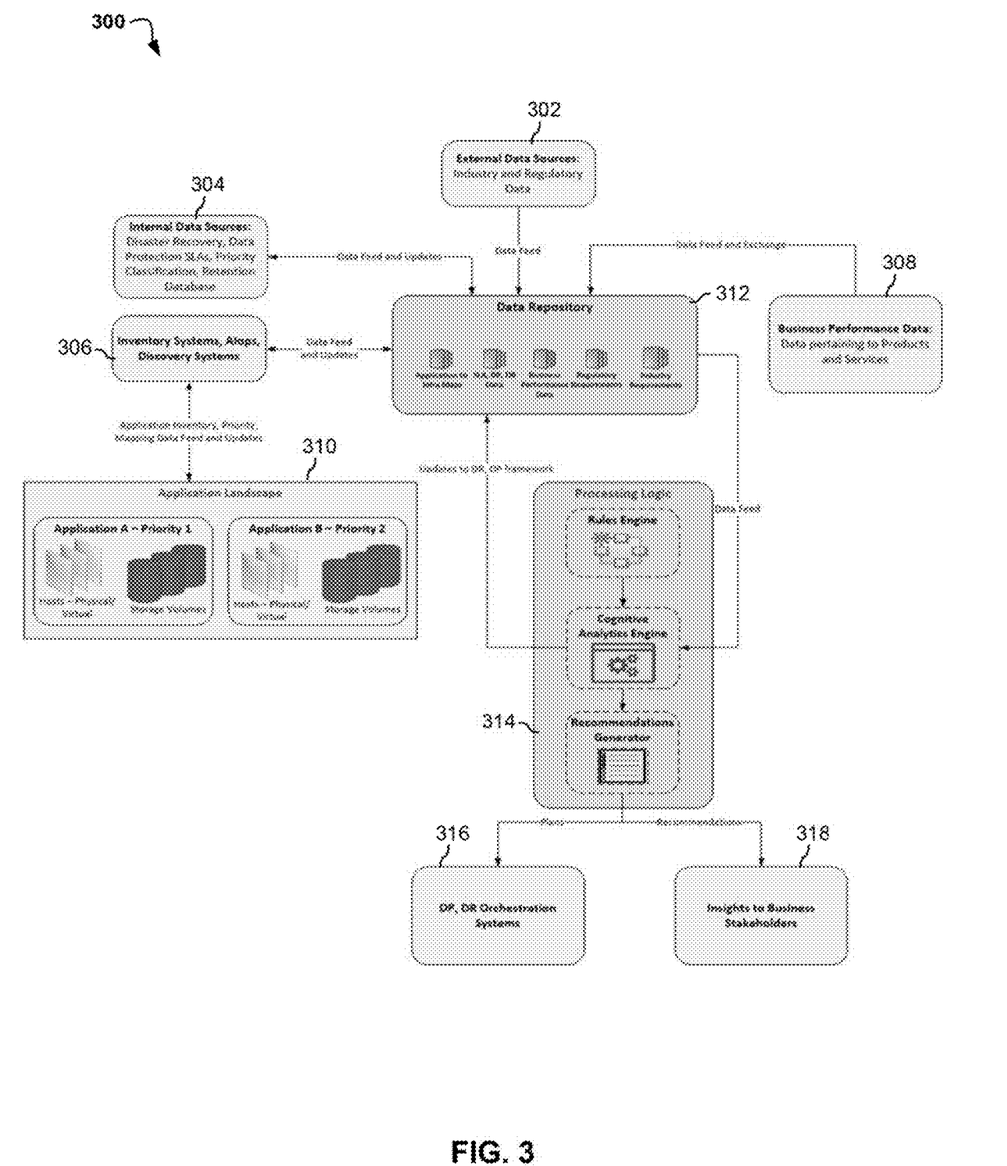
FIG. 3 depicts an interaction between solution components of the process in FIG. 2 according to at least one embodiment.

Referring now to FIG. 3, the interaction between the solution components of the cognitive data protection and disaster recovery policy management process 200 is depicted. The data may be extracted from external data sources 302 and internal data sources 304, and inventory systems, artificial intelligence (AI) ops, and discovery systems 306, as well as business performance data 308 may be fed into the repository 312. The data included in the steps above may also be fed into the repository 312. Additionally, the application landscape 310, along with the priorities of the one or more applications, may be fed into the repository 312. Processing logic 314 includes a rules engine module, the cognitive analytics engine module, and the recommendation generator module. The pre-configured, customizable rules may be fed into the cognitive analytics engine module, where the differential analysis occurs on the data and the changes to the data. The output of the cognitive analytics engine module may be fed to the recommendation generator module. The recommendation generator module may generate the one or more recommendations and the recommendations may automatically modify the current DP and DR policies 316 and/or create the new DP and DR policies 316, or the recommendations may be presented to the business stakeholder 318.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
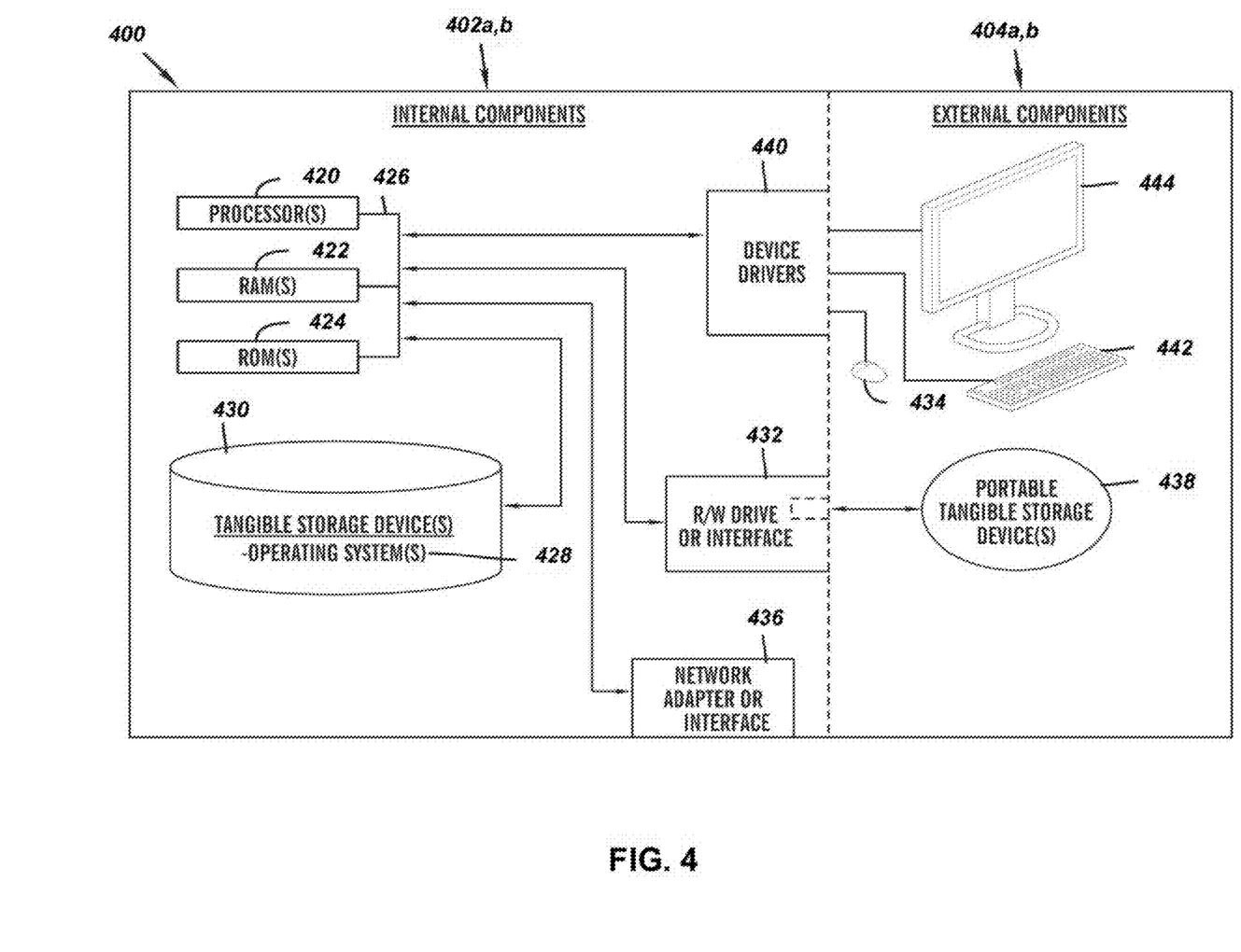
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428 and the cognitive data protection program 110A in the client computing device 102 and the cognitive data protection program 110B and the software program 108 in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cognitive data protection program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The cognitive data protection program 110A in the client computing device 102 and the software program 108 and the cognitive data protection program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the cognitive data protection program 110A in the client computing device 102 and the software program 108 and the cognitive data protection program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
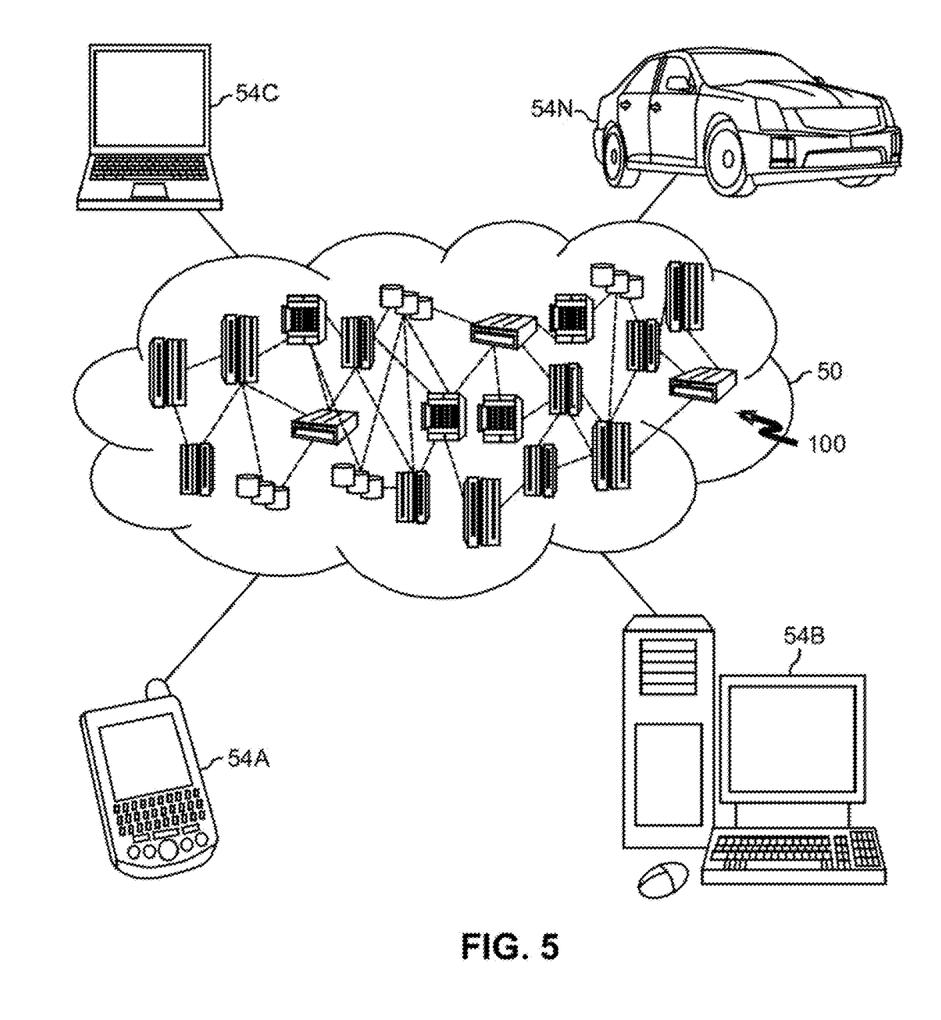
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
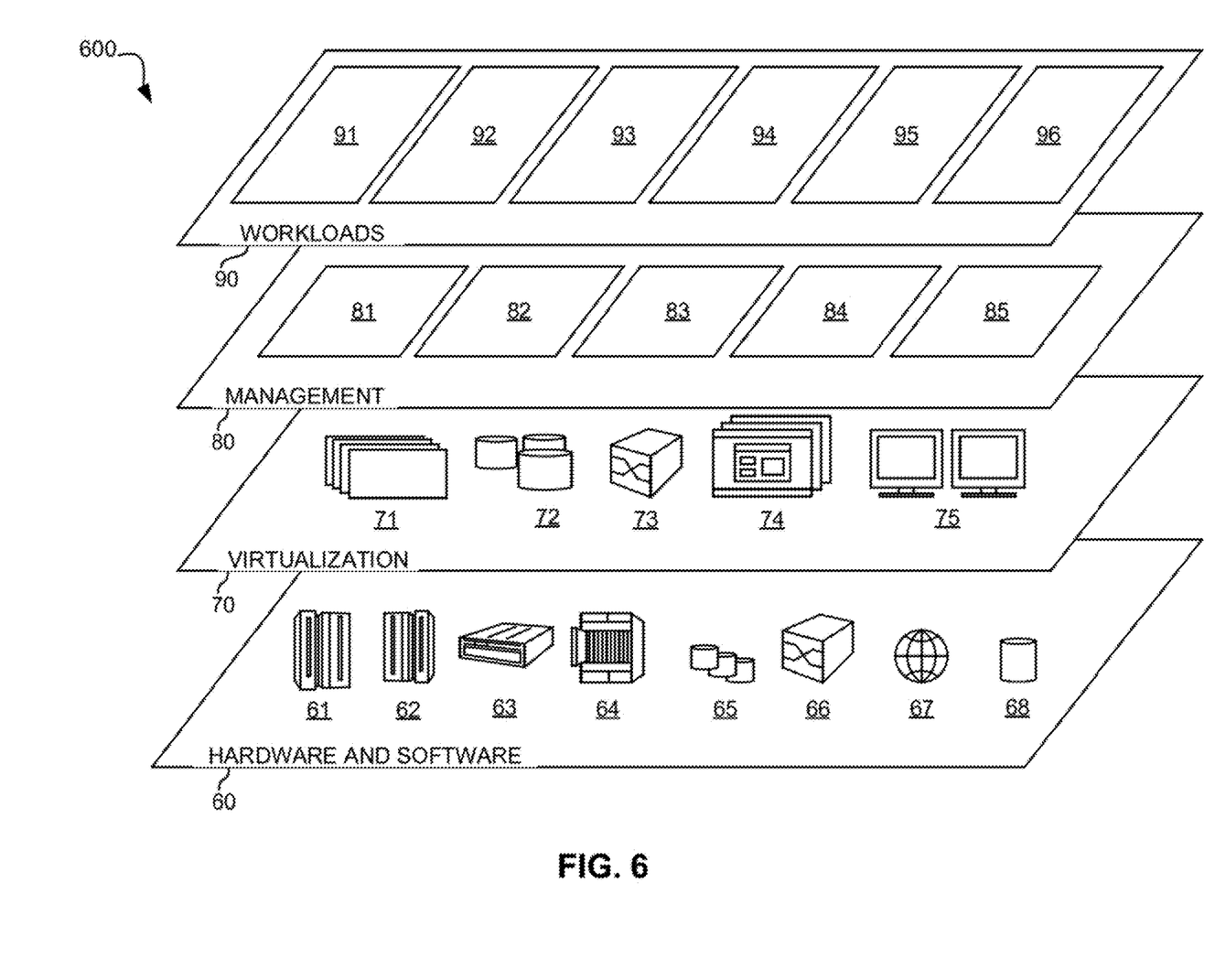
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitively aligning DP and DR policies of an organization with a current business climate 96. Cognitively aligning DP and DR policies of an organization with a current business climate 96 may relate to continually aligning the DP and DR policies of an organization with the current business climate in order to maintain availability of applications and data per readjusted SLAs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of cognitively aligning data protection (DP) and disaster recovery (DR) policies, the method comprising:
ingesting a variety of data associated with one or more applications into a repository, the data including a current priority of the one or more applications, current DP and DR policies contained in a service-level agreement (SLA), existing industry, sector, and government regulatory requirements, and new industry, sector, and government regulatory requirements;
executing differential analysis on the data and changes to the data, wherein the changes to the data are obtained by periodically polling internal and external data sources;
identifying differences between the data and the changes to the data based on the differential analysis;
translating the differences between the data and the changes to the data into an updated SLA;
determining whether the differences between the data and the changes to the data warrant a change in the current DP and DR policies and/or creation of new DP and DR policies; and
in response to determining that the differences between the data and the changes to the data warrant the change in the current DP and DR policies and/or the creation of the new DP and DR policies, generating one or more recommendations to modify the current DP and DR policies and/or create the new DP and DR policies.

2. The method of claim 1, wherein pre-configured, customizable rules are utilized in executing the differential analysis.

3. The method of claim 1, wherein the one or more applications are mapped to one or more hosts.

4. The method of claim 1, wherein the one or more generated recommendations are presented to a business stakeholder.

5. The method of claim 1, wherein one or more orchestration engines are utilized to automatically modify the current DP and DR policies and/or create the new DP and DR policies based on the one or more generated recommendations.

6. The method of claim 1, wherein the one or more generated recommendations are based on a detected difference between the current priority of the one or more applications and a past priority of the one or more applications.

7. The method of claim 1, wherein the data is selected from a group consisting of performance metrics data of products and services in an organization, business climate data, one or more geographic spans of the one or more applications, data retention requirements in the SLA, and internal details on policies and objectives of an organization.

8. A computer system, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, each storage medium of the one or more storage media not being a transitory propagating signal, the computer system configured to perform a method, the method comprising:
ingesting a variety of data associated with one or more applications into a repository, the data including a current priority of the one or more applications, current data protection (DP) and disaster recovery (DR) policies contained in a service-level agreement (SLA), existing industry, sector, and government regulatory requirements, and new industry, sector, and government regulatory requirements;
executing differential analysis on the data and changes to the data, wherein the changes to the data are obtained by periodically polling internal and external data sources;
identifying differences between the data and the changes to the data based on the differential analysis;
translating the differences between the data and the changes to the data into an updated SLA;
determining whether the differences between the data and the changes to the data warrant a change in the current DP and DR policies and/or creation of new DP and DR policies; and
in response to determining that the differences between the data and the changes to the data warrant the change in the current DP and DR policies and/or the creation of the new DP and DR policies, generating one or more recommendations to modify the current DP and DR policies and/or create the new DP and DR policies.

9. The computer system of claim 8, wherein pre-configured, customizable rules are utilized in executing the differential analysis.

10. The computer system of claim 8, wherein the one or more applications are mapped to one or more hosts.

11. The computer system of claim 8, wherein the one or more generated recommendations are presented to a business stakeholder.

12. The computer system of claim 8, wherein one or more orchestration engines are utilized to automatically modify the current DP and DR policies and/or create the new DP and DR policies based on the one or more generated recommendations.

13. The computer system of claim 8, wherein the one or more generated recommendations are based on a detected difference between the current priority of the one or more applications and a past priority of the one or more applications.

14. The computer system of claim 8, wherein the data is selected from a group consisting of performance metrics data of products and services in an organization, business climate data, one or more geographic spans of the one or more applications, data retention requirements in the SLA, and internal details on policies and objectives of an organization.

15. A computer program product, the computer program product comprising: one or more computer-readable tangible storage media and program instructions stored on at least one of the one or more tangible storage media, each storage medium of the one or more storage media not being a transitory propagating signal, the program instructions executable by a processor capable of performing a method, the method comprising:
ingesting a variety of data associated with one or more applications into a repository, the data including a current priority of the one or more applications, current data protection (DP) and disaster recovery (DR) policies contained in a service-level agreement (SLA), existing industry, sector, and government regulatory requirements, and new industry, sector, and government regulatory requirements;
executing differential analysis on the data and changes to the data, wherein the changes to the data are obtained by periodically polling internal and external data sources;
identifying differences between the data and the changes to the data based on the differential analysis;
translating the differences between the data and the changes to the data into an updated SLA;
determining whether the differences between the data and the changes to the data warrant a change in the current DP and DR policies and/or creation of new DP and DR policies; and
in response to determining that the differences between the data and the changes to the data warrant the change in the current DP and DR policies and/or the creation of the new DP and DR policies, generating one or more recommendations to modify the current DP and DR policies and/or create the new DP and DR policies.

16. The computer program product of claim 15, wherein pre-configured, customizable rules are utilized in executing the differential analysis.

17. The computer program product of claim 15, wherein the one or more applications are mapped to one or more hosts.

18. The computer program product of claim 15, wherein the one or more generated recommendations are presented to a business stakeholder.

19. The computer program product of claim 15, wherein one or more orchestration engines are utilized to automatically modify the current DP and DR policies and/or create the new DP and DR policies based on the one or more generated recommendations.

20. The computer program product of claim 15, wherein the one or more generated recommendations are based on a detected difference between the current priority of the one or more applications and a past priority of the one or more applications.

* * * * *